June 29, 1926.
H. KENNELL
1,590,761
SELF CLOSING AND POSITIVE GAS CUT-OFF VALVE
Filed May 25, 1922
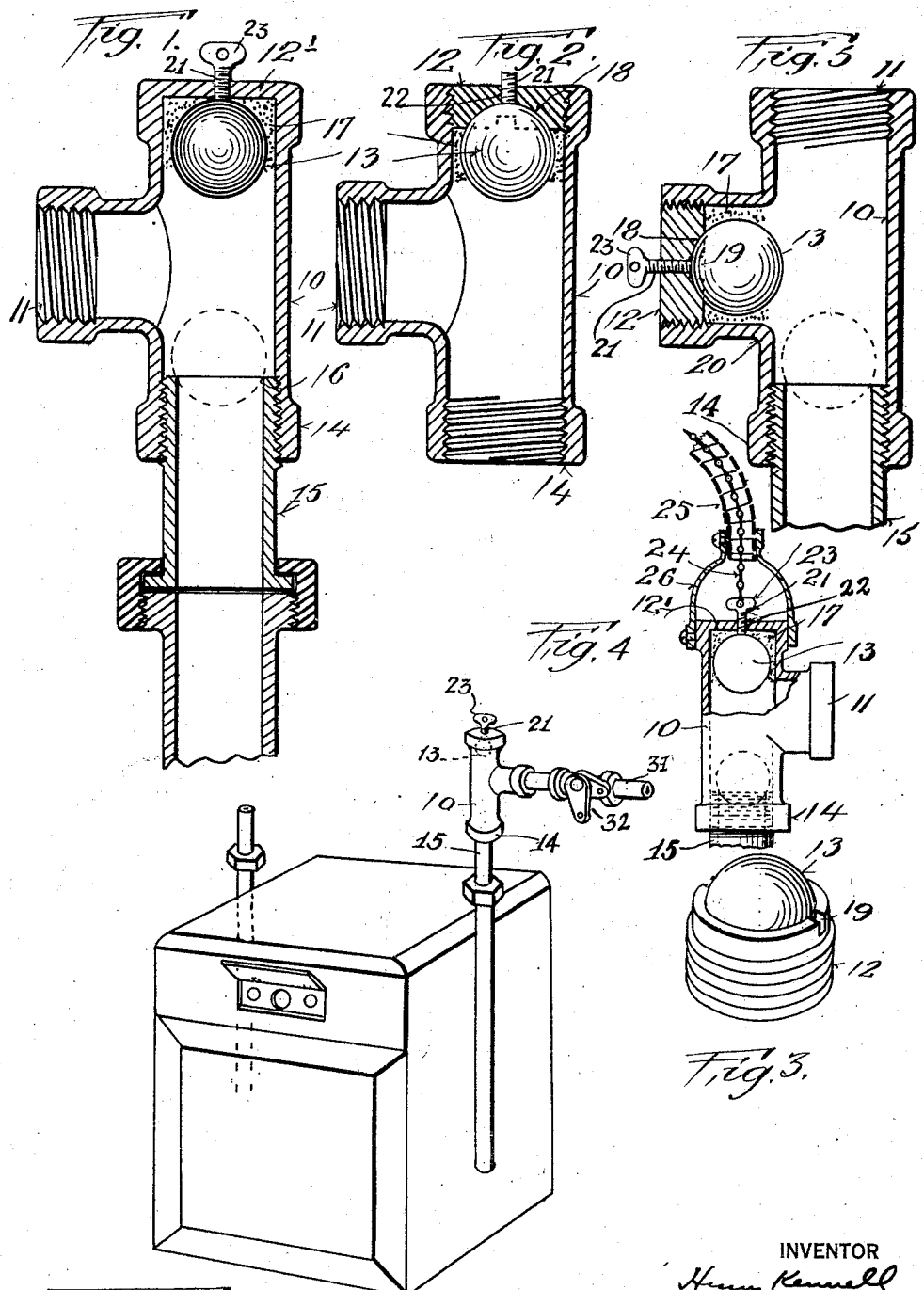
INVENTOR
Henry Kennell
BY his ATTORNEYS Patented June 29, 1926.

1,590,761

UNITED STATES PATENT OFFICE.

HENRY KENNELL, OF NEW YORK, N. Y.

SELF-CLOSING AND POSITIVE GAS CUT-OFF VALVE.

Application filed May 25, 1922. Serial No. 563,691.

This invention relates to shut-off valves which, under certain predetermined conditions, act automatically, and which are also provided with supplementary means for positively closing, from a remote point, the said valves at any time before the stated predetermined conditions have been reached.

A further object includes the provision of a ball-valve wherein the ball, or equivalent device, is held in suspended position until released by the melting or softening of the sealing medium, or by positive displacing means.

Another object includes the provision of a simple but efficient valve which is positive in action and which is proof against unauthorized tampering with the gas supply.

A further object includes the production of an inexpensive device which may be readily installed for the purpose stated.

Other objects will appear hereinafter, and I attain these objects by the device illustrated in the accompanying drawing in which:—

Figure 1 shows a sectional view of one form of my device with a portion of the positive ball dislocating means omitted.

Fig. 2 is a view in section showing the ball suspended in a disk or plug.

Fig. 3 is a view in perspective of one form of a holding disk and ball therefor.

Fig. 4 is a view showing means for positively dislocating the ball.

Fig. 5 is a view in section of a form similar to that shown in Fig 2, but having the holding disk and ball in the lateral opening of the T-coupling.

Fig. 6 shows a mode of application of my valve.

Like numerals refer to similar parts throughout the several views.

In case of fires it frequently happens that the source of gas supply becomes opened and volumes of inrushing gas ignite and produce an intense and dangerous torch. Without some external or automatic gas cut-off, the blaze of this torch can be checked only with great difficulty, if at all. It is, therefore, the prime object of my invention to obviate the above-named conditions by use of my automatic and positive gas cut-off valve. This valve may be installed at one or more points within the gas pipe system of the building to be protected and usually, though not necessarily, I install my device immediately above the meter, as is shown in Fig. 6, for example. I provide an outside pull-box of the standard and well known type (not herein shown) for positively operating the valve in the manner hereinafter stated.

For the purpose of illustration, without, however, thus limiting myself, I have shown, in the accompanying drawing, specific examples of my cut-off, or valve device, where a T-coupling 10 is provided with a screw-threaded gas inlet 11, a ball-suspension seat 12 closing the end of one arm of the coupling and containing a ball 13, (see Figs. 2 and 3) and a gas outlet 14 for receiving a gas conducting pipe or coupling 15. This coupling 15 forms the ball valve seat 16 for receiving the ball and to thus shut off the flow of gas under the predetermined conditions stated. The ball may be held in its suspension-seat in any desired manner and by any desired means which will permit its detachment automatically under predetermined temperatures, or its positive detachment before said temperatures are reached. Connected to the inlet 11 is the gas supply pipe 31 which is provided with a cut-off valve 32 of standard construction.

As a specific example of a practical application of my invention, I cause the ball 13 to be held in its suspended position by means of a suitable cement or solder 17, and I find sealing wax, soft solder or rose metal, and the like, to serve very satisfactorily. The ball may be cemented directly onto the blind seat 12' as shown in Figs. 1 and 4 or it may rest in a depression 18 of the separately formed ball seat member or plug 12 as shown in Figs. 2, 3 and 5.

Where the screw-plug type of seat is used it is desirable to so construct said plug that it cannot be removed by unauthorized persons or for fraudulent purposes. To this end I provide the inner side only of the ball seat member 12, with notches 19, for screwing said seat member in place before the ball is sealed in. From this construction it is obvious that when the ball has been sealed in, and after the coupling has been connected, the plug cannot be removed from without.

I also provide a construction for positively displacing the ball to render it effective in shutting off the gas supply in case the coupling and valve are not heated. I have shown the device in detail in connection with the blind seat 12', in Fig. 4, while in Figs. 1, 2, 5 and 6 only the screw 21 of the positively actuated ball displacing means is shown. Other equivalent displacing means might be employed. The ball displacing type here illustrated comprises a displacing member 21 in the form of a screw extending through a screw-hole 22 against the ball 13. To the wing 23 of the screw there is connected any suitable operating device 24, as a chain or cable, extending through a flexible cable 25, or equivalent, as a pipe which may be connected to a pull box (not shown) on the outer side of the wall of a house or building. A cap 26, fitting over the end of the coupling supports the cable and for protection against corrosion, I may fill the cap and cable with a suitable lubricant. This construction permits the ball to be positively dislocated from any distant point to which the operating means has been extended by causing the displacing member 21 to be turned or screwed down to dislocate the ball 13. This connection is intended for use under special and peculiar conditions for the positive operation or manipulation of the valve.

In the usual course of events however, where the valve is subjected to increase of temperature as a result, the automatic feature heretofore outlined effects the dislodging of the ball and by reason of the heated or melted cementing medium the ball is also securely cemented to its seat by the same cementing medium and the gas is positively and securely shut off.

The simplicity and efficiency of my device will recommend itself to those versed in the art, as it is a practical and effective means for eliminating one of the main sources of danger to firemen and for curbing stubborn conflagrations.

While I have disclosed a specific embodiment of my invention, I do not thereby desire to be understood as having thus limited myself unnecessarily, as various modifications falling within the spirit and scope of my invention will, no doubt present themselves to those versed in the art.

What I claim, therefore, as new and useful, of my own invention, and desire to secure by Letters Patent, is:—

1. A normally open valve for automatically cutting off the flow of gas under predetermined abnormal conditions, which comprises a T-coupling member having the outer end of one of its arms closed, a ball valve normally held within said arm and adapted to be released when said abnormal conditions are present, a valve seat for said ball, and means for positively disengaging said ball so as to permit it to engage its seat and cut off the flow.

2. A normally open valve for automatically cutting off the flow of gas under predetermined conditions, which comprises a T-coupling member having one arm closed, a valve ball held within the closed arm of said member and adapted to be released under said predetermined conditions, a valve seat for said ball, and means for positively disengaging said ball.

3. A device for automatically cutting off the flow of gas, which comprises coupling members having seats, one of said seats serving to retain a ball potentially and the other serving as a seat adapted to be engaged by the ball to shut off the flow of gas, a ball cemented to one of said seats by readily fusible means, whereby said ball may be released at a predetermined temperature to be transferred to the gas shut-off seat, and a second member in the seat which retains the ball for dislocating said ball.

4. A safety device for automatically stopping the flow of gas under predetermined temperature conditions, which comprises a T-coupling having seats, one of said seats closing an arm of the coupling and serving to retain a ball potentially and the other serving as a seat adapted to be engaged by the ball to shut off the gas flow, a ball, fusible means for holding said ball on one of said seats until said temperature has been attained, and means for forcing said ball from its seat.

In testimony whereof I have hereunto set my hand on this 12th day of May A. D., 1922.

HENRY KENNELL.